UNITED STATES PATENT OFFICE 2,372,041

SYNTHESIS OF PANTOTHENIC ACID

Dilworth Wayne Woolley, New York, N. Y., assignor to National Oil Products Company, Harrison, N. J., a corporation of New Jersey No Drawing. Application July 30, 1940, Serial No. 348,451

7 Claims. (Cl. 260—534)

The present invention relates to the so-called chick antidermatitis factor and particularly to the synthesis of this factor which has now been designated as pantothenic acid.

The "chick antidermatitis factor" and pantothenic acid have now been found to be the same chemical compound. This recently discovered vitamin plays an important role in the growth of various living creatures; the absence of which in the diet results in dermatitis and other disorders. In a chick, for example, the absence of pantothenic acid in its diet causes fissures to develop around its beak and eyes. It has been firmly established that pantothenic acid is necessary in the proper nutrition of chickens, rats, dogs, sheep and other living creatures.

Pantothenic acid has been found to exist in varying amounts in nature; some of the more potent sources including beef, pork and sheep livers, the vitamin B complex derived from rice bran, dried brewer's yeast, cane molasses, egg yolk, dried whey and peanut meal. In order to recover pantothenic acid from the foregoing natural sources extremely complicated extraction procedures must be resorted to, which is due partially to the lability of pantothenic acid to hot acids and alkalis. The extraction processes now available render the recovery of pantothenic acid from its natural sources prohibitive in commercial practice due to the high costs involved.

The general object of the invention is to provide a process of synthesizing pantothenic acid.

A specific object of the invention is to produce pantothenic acid at a reasonable cost and in a purified state.

Another object of the invention involves the preparation of new compounds useful in the synthesis of pantothenic acid.

Other objects of the invention will in part be obvious and will in part appear hereinafter.

In accordance with its broader aspects, the invention comprises a process involving the condensation of an $\alpha\gamma$ diacyloxy $\beta\beta$ dimethyl butyryl halide with a suitable derivative of $\beta$ alanine. The condensation of compounds of the aforementioned type is preferably carried on without the aid of heat and in the presence or not of a suitable solvent; preferably an alkyl ester of $\beta$ alanine is used in the condensation step, such as the methyl, ethyl, propyl or other suitable ester of $\beta$ alanine. The invention further contemplates the preparation of new chemical compounds developed in the synthesis of pantothenic acid. Such new compounds include the salt or halide of acylated $\alpha\gamma$ dihydroxy $\beta\beta$ dimethyl butyric acid, as well as the product produced by the condensation of an ester of $\beta$ alanine with a halide of acylated $\alpha\gamma$ dihydroxy $\beta\beta$ dimethyl butyric acid. In the preparation of an $\alpha\gamma$ diacyloxy $\beta\beta$ dimethyl butyryl halide, it is preferable to start with $\alpha$ hydroxy $\beta\beta$ dimethyl $\gamma$ butyryl lactone, which is a readily available compound. Suitable derivatives of this lactone must be made, however, in order to first free the $\gamma$ hydroxyl group and subsequently block the hydroxy groups so that the proper condensation with $\beta$ alanine may be obtained. This is achieved by first forming a salt of $\alpha$ hydroxy $\beta\beta$ dimethyl $\gamma$ butyryl lactone. In the formation of this salt, which serves to free the $\gamma$ hydroxyl group, any suitable alkaline agent may be used, such as sodium hydroxide, barium hydroxide, potassium hydroxide, calcium hydroxide, alkali carbonates and the like. In order to block the hydroxyl groups, the foregoing salt is treated with an aliphatic acid anhydride such, for example, as acetic anhydride, propionic anhydride and the like, the use of acetic anhydride being preferred.

The invention accordingly comprises the several steps and relation of one or more of such steps with respect to each of the others, and the products possessing the features, properties and the relation of elements, which are exemplified in the following detailed disclosure, and the scope of the invention will be indicated in the claims.

More specifically, in carrying out the process of the invention, it is preferred to commence the synthesis of pantothenic acid with $\alpha$ hydroxy $\beta\beta$ dimethyl $\gamma$ butyryl lactone which has the following structural formula:

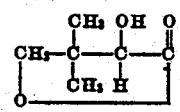

The foregoing lactone is preferably treated with a one normal solution of sodium hydroxide and the mixture evaporated to dryness, whereupon the sodium salt of $\alpha\gamma$ dihydroxy $\beta\beta$ dimethyl butyric acid is formed. While sodium hydroxide is preferred in this step, it is obvious that any other suitable base may be employed, including, among others, potassium, barium and calcium hydroxides, alkali carbonates, etc.

The next step in the synthesis involves the conversion of the hydroxyl groups of the original acid into acyl groups by treatment of the salt with an aliphatic acid anhydride, preferably acetic anhydride. A large excess of the acetic anhydride is added to the salt, after which the mixture is heated and evaporated to dryness, preferably under reduced pressure, thus forming the sodium salt of αγ diacetoxy ββ dimethyl butyric acid, which has the following structural formula:

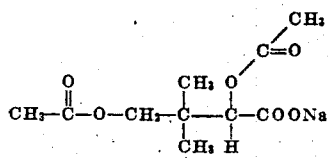

While it is believed that the anhydride reacts with both the hydroxyl groups, it may be that only the γ hydroxyl group is reacted, whereby the α hydroxyl group remains intact. If the α hydroxyl group is not reacted with the anhydride, it will not react with any of the other reagents used in the process to interfere with the desired synthetic end product.

The foregoing compound is next treated with a suitable agent to convert the salt into a halide. In this operation thionyl chloride is permitted to stand for a while with the foregoing acetoxy salt, after which the excess thionyl chloride is distilled off under vacuum and heating continued to dry the mass. The chloride may also be produced by using phosphorus pentachloride in lieu of thionyl chloride; the excess phosphorus pentachloride, however, must be removed by neutralization with glacial acetic acid. In view of the volatility of thionyl chloride, the use thereof is preferred inasmuch as the excess may be removed by simple distillation. After halogenation αγ diacetoxy ββ dimethyl butyryl chloride results, which has the formula

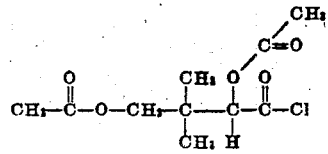

The foregoing compound is now admixed with an alkyl ester of β alanine, whereby the chloride combines with a hydrogen atom of the amino group of β alanine to accomplish the amide linkage between the αγ diacetoxy ββ dimethyl butyryl chloride and the β alanine alkyl ester. The condensation is preferably carried out at room temperature or slightly below (10° to 20° C.) and is usually completed in about one hour. In order to neutralize the HCl given off during the condensation, a suitable amount of pyridine may be provided in the mixture or an excess of the β alanine ester may be provided. Likewise, pyridine, ether or the like may be used as a solvent during the condensation which proceeds as follows:

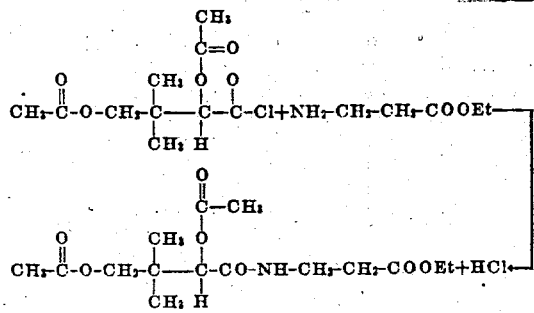

In the event that an excess of the β alanine ester is used, it is preferred to remove the same from the condensation product by taking up the reaction mass in water and acidifying the same to a pH value of about 1.5 to 2.5, after which the same is extracted with a suitable solvent such as ethyl acetate, the resulting solvent solution of the condensation product is then evaporated to dryness.

The foregoing condensation product is freed of its acetoxy groups and the ester group by treatment with a 10% solution of sodium hydroxide in absolute alcohol. Any suitable base may be used in this saponification process, it being necessary, however, to use a substantially anhydrous reagent as the condensation product will not tolerate much more than about 2% water in the mixture; 10% sodium hydroxide in absolute ethanol is highly preferred in the saponification procedure which is carried out at room temperature or slightly less than room temperature, i. e. 10° to 20° C. This saponification step may also be carried out by passing ammonia gas into the condensation product and heating the same for about one hour at 100° C. in a closed vessel. The resulting saponified product which has the following structural formula

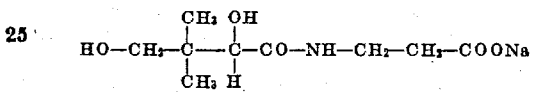

may then be slightly acidified with a suitable mineral acid such as hydrochloric acid and the product filtered, evaporated to dryness under vacuum and extracted with absolute alcohol, whereby pantothenic acid having the following structural formula results:

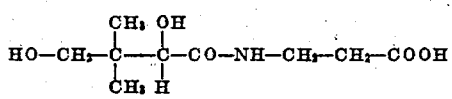

It has been found that the salt of pantothenic acid is equally as active as pantothenic acid itself; furthermore, the preparation and use of the salt itself is preferred in view of its greater chemical stability. Moreover, any salt of pantothenic acid may be prepared according to the process of the invention and used as such; these salts include, among others, the alkali metal, ammonium and alkaline earth salts.

Since certain changes in carrying out the above process and certain modifications in the product which embody the invention may be made without departing from its scope, it is intended that all matter contained in the above description shall be interpreted as illustrative and not in a limiting sense.

Having described my invention, what I claim as new and desire to secure by Letters Patent, is:

1. In the process of synthesizing the chick antidermatitis factor, the step which comprises condensing an αγ diacyloxy ββ dimethyl butyryl halide with an alkyl ester of β alanine.

2. In the process of synthesizing the chick antidermatitis factor, the step which comprises condensing αγ diacetoxy ββ dimethyl butyryl chloride with an alkyl ester of β alanine.

3. A process of synthesizing the chick antidermatitis factor, which comprises condensing an αγ diacyloxy ββ dimethyl butyryl halide with an alkyl ester of β alanine and saponifying all the ester linkages in the condensation product.

4. A process of synthesizing the chick antidermatitis factor, which comprises condensing αγ diacetoxy ββ dimethyl butyryl chloride with an alkyl ester of β alanine and saponifying all the ester linkages in the condensation product.

5. A process of synthesizing the chick antidermatitis factor, which comprises treating α hydroxy ββ dimethyl γ butyryl lactone with an inorganic alkaline agent to form a salt thereof, reacting said salt with an aliphatic acid anhydride, halogenating the acylated product, condensing said product with an alkyl ester of β alanine and saponifying all the ester linkages in the condensation product.

6. A process of synthesizing the chick antidermatitis factor, which comprises treating α hydroxy ββ dimethyl γ butyryl lactone with an alkali to form a salt thereof, reacting said salt with acetic anhydride, chlorinating the acetylated product, condensing said product with an alkyl ester of β alanine and saponifying all the ester linkages in the condensation product.

7. In the process of synthesizing the chick antidermatitis factor, the step which comprises condensing an alkyl ester of β alanine with a chemical compound selected from the class having the following general formula:

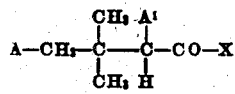

wherein A represents an acetoxy group, A¹ represents a member selected from the group consisting of acetoxy and hydroxyl groups and X represents a halogen atom.

DILWORTH WAYNE WOOLLEY.